United States Patent
Brown

[11] Patent Number: 6,086,462
[45] Date of Patent: Jul. 11, 2000

[54] COPING AND PROFILE CUTTING AND/OR SANDING APPARATUS

[76] Inventor: Thomas J. Brown, P.O. Box 1218, Boulder Creek, Calif. 95006

[21] Appl. No.: 09/001,089

[22] Filed: Dec. 30, 1997

[51] Int. Cl.[7] ..................................................... B24B 7/00
[52] U.S. Cl. ............................................. 451/70; 451/495
[58] Field of Search ................................. 451/69, 70, 495, 451/505

[56] References Cited

U.S. PATENT DOCUMENTS

| | | | |
|---|---|---|---|
| 470,794 | 3/1892 | Shempp | 451/495 |
| 567,905 | 9/1896 | Locke | 451/495 |
| 753,251 | 3/1904 | Ekvall | 451/495 |
| 1,062,214 | 5/1913 | Bergman | 451/524 |
| 1,570,177 | 1/1926 | Pointer | 451/495 |
| 1,881,839 | 10/1932 | Monson | 451/123 |
| 2,426,028 | 8/1947 | Krueger . | |
| 3,418,758 | 12/1968 | McEwan | 451/121 |
| 5,136,904 | 8/1992 | Peters . | |
| 5,363,732 | 11/1994 | Heasley . | |
| 5,554,066 | 9/1996 | Bosten et al. . | |

*Primary Examiner*—Timothy V. Eley
*Assistant Examiner*—Dung Van Nguyen

[57] ABSTRACT

A powered coping and profile cutting and/or sanding apparatus is able to impart any shape to the surface of a body of material (17) at any angle, simple or compound, relative to the body of material. The apparatus comprises a reciprocating "frame"(36) encasing thin stacking metal sheets (42) which are adjustable in a forward/backward direction for allowing multiple shape setups. The sheets (42), which are oriented vertically, have saw teeth at their top sections (42*a*) and no teeth at their bottom sections (42*b*). Adhesive-backed sandpaper (78) is affixed to the bottom section (42*b*) after the shape is set. This allows a cutting phase and a sanding phase with the same profile. The entire reciprocating frame (36) pivots multidirectionally within two planes, and may be locked at any angle. The reciprocating frame (36) is movable in a forward/backward direction. The body of material (17) being cut is immovably clamped, and the frame (36) is moved into the body of material (17) for the cutting and/or sanding operation.

33 Claims, 7 Drawing Sheets

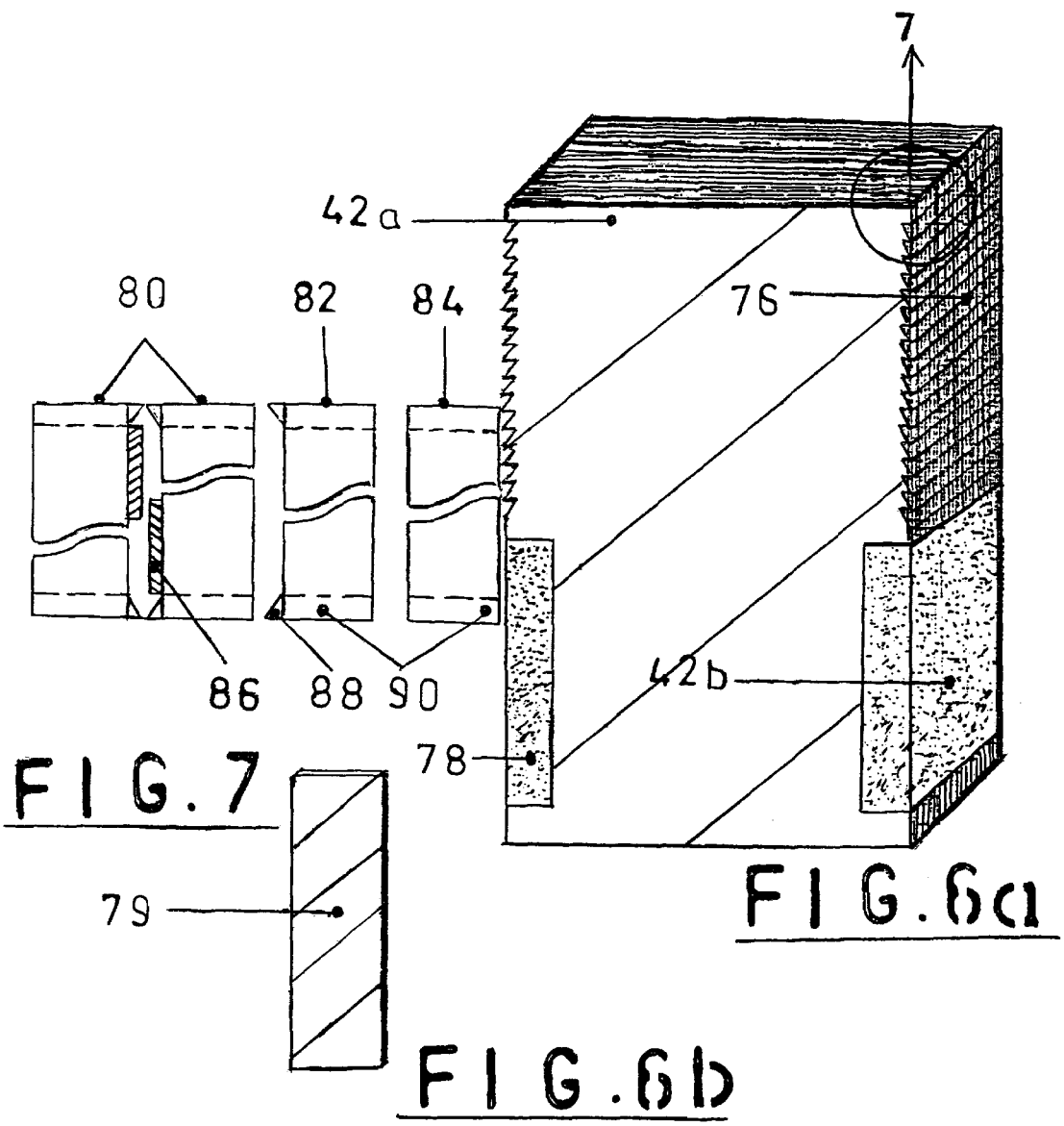

COPING AND PROFILE CUTTING AND/OR SANDING APPARATUS

BACKGROUND

1. Field of the Invention

This invention relates to the working of wood and other materials, specifically to powered coping apparatus and tools, such as bandsaws, jigsaws, and scrollsaws used in the cutting of shapes into materials. Additionally, this invention relates to powered profile sanders, used in the sanding of profiled materials.

2. Description of Prior Art

The utilization of various types of power saws to shape-cut materials has been in common practice since the advent of the industrial revolution. More recently, power tools have been utilized to perform the difficult task of cutting shapes in materials, defined as "coping". Additionally, power tools recently have been utilized to perform the difficult task of sanding intricate shapes which already have been cut into materials. However, due to the need for multiple tools and multiple shape setups, as well as a required high skill level to operate the tools, only a small number of artisans can accomplish these tasks. Moreover, present technology has certain inherent limitations, such as an inability to effectively cut and sand shapes into the side, top, bottom, and end of materials, and the necessity of separate tools and tool setups to saw and then sand intricate shapes into the material. Additionally, present technology requires two separate setups to create shapes and their corresponding negative shapes.

For example: the saw shown in U.S. Pat. No. 5,136,904 to Peters, Aug. 11, 1992, which is a reciprocating saw blade within a pivotable frame, has the following limitations.

(a) It is difficult to cut shapes into the sides, top, and bottom of materials.
(b) Advanced skill is required to operate this saw.
(c) The user is unable to adjust the shape of the cutting blades to any shape in a minimal amount of time, and is unable to make identical multiple cuts.
(d) It is difficult to cut shapes into materials at both simple and compound angles.
(e) A rough saw-marked texture remains on the material after sawing.
(f) It is difficult to manipulate or angularly clamp long or heavy materials around stationary machinery.
(g) Two separate setups are required for the original shape and the negative of the original shape.
(h) Only a small number of types of materials can be cut by this tool.
(i) Profile cuts cannot be done in a precise manner.
(j) Awkward blade manipulations are required to perform cuts in materials.

With the exception of items b, f, and j from the above-list, the saw in U.S. Pat. No. 5,363,732 to Heasley, Nov. 15, 1994 has the same limitations as the saw in the Peters patent. This apparatus includes a circular saw that is mounted on two sliding bases. Besides the circular saw there is a support for a stylus used to control the positioning of the saw blade by traversing a profile template.

The commonly used bandsaw and scrollsaw have the same limitations as those in the Peters patent, except for item j.

The commonly used jigsaw has the same limitations as those in the Peters patent, except for items a and f.

A profile sanding apparatus is shown in U.S. Pat. No. 2,426,028 to Krueger, Aug. 19, 1947 and U.S. Pat. No. 5,554,066 to Bosten et al., Sep. 10, 1996. These apparatus utilize a profiled sanding pad coupled to a mechanism to provide motion to the sanding pad. These apparatus are limited by the following factors:

(k) There are only a limited number of standard profile sanding shapes available to be attached to the sanders.
(l) These separate sand-alone sanding tools require the artisan to use two separate tools, requiring two separate setups for the sanding and cutting operations.
(m) These tools cannot be adjusted to cut non-standard profile shapes and cannot be adjusted to create simultaneously both a custom profile and the negative of that profile.

OBJECTS AND ADVANTAGES

Thus, it is one object of the invention to provide an improved cutting and sanding tool which overcome the above limitations of the present technology. These limitations include: the need for advanced operator skill, limited versatility with respect to the materials and shapes which can be cut and sanded, and shape cutting and sanding innacuracies and non-repeatability. Additionally, the awkward nature of material handling and complex blade manipulations are a limitation.

Other objects and advantages of the invention include the provision of an apparatus which:

(a) easily cuts and sands shapes into the sides, top, bottom, or ends of materials,
(b) requires minimal skills to operate,
(c) can be quickly adjusted to create custom cutting and sanding profile shapes,
(d) easily and accurately cuts shapes into materials at both simple and compound angles,
(e) leaves a smoothly sanded surface after cutting material into a desired shape,
(f) allows the material being cut and sanded to be clamped immovably on a horizontal surface for the cutting and sanding operation,
(g) cuts and sands both the original shape and the negative of the original shape with only one setup operation,
(h) is able to cut and sand a broad spectrum of materials,
(i) provides repetitive high-tolerance shape cutting and sanding,
(j) achieves the cutting and sanding of complex shapes with a simple straight-line blade manipulation,
(k) adjusts the shape of the sanding profile simultaneously with the adjustment of the cutting profile, retaining these shapes for identical repetitive cutting and sanding operations,
(l) requires low skill level to form the custom profile sanding shape with zero margin of error between the cutting profile shape and the sanding profile shape,
(m) in one setup operation provides the cutting and sanding profile of both the profile and the negative of the profile, The possibilities are extensive with respect to the uses of this shape cutting device, such as the coping of moldings to other moldings, milling of notches or shapes into the sides, top, bottom, or ends of materials, coping of material to conform to other shaped materials, etc. The possibilities are as diverse as the needs and imagination of the user.

Further objects and advantages of my invention will become apparent from a consideration of the drawings and ensuing description.

DRAWING FIGURES

The present invention will be more fully understood when the following description is read in light of the accompanying drawings in which:

FIG. 6a is a perspective view of stacking, cutting, and sanding blades used in the apparatus.

FIG. 6b is a perspective view of the sandpaper application tool.

FIG. 7 is an exploded plan view of the stacking, cutting, and sanding blades shown in FIG. 6.

REFERENCE NUMERALS IN DRAWINGS

Figure 1:
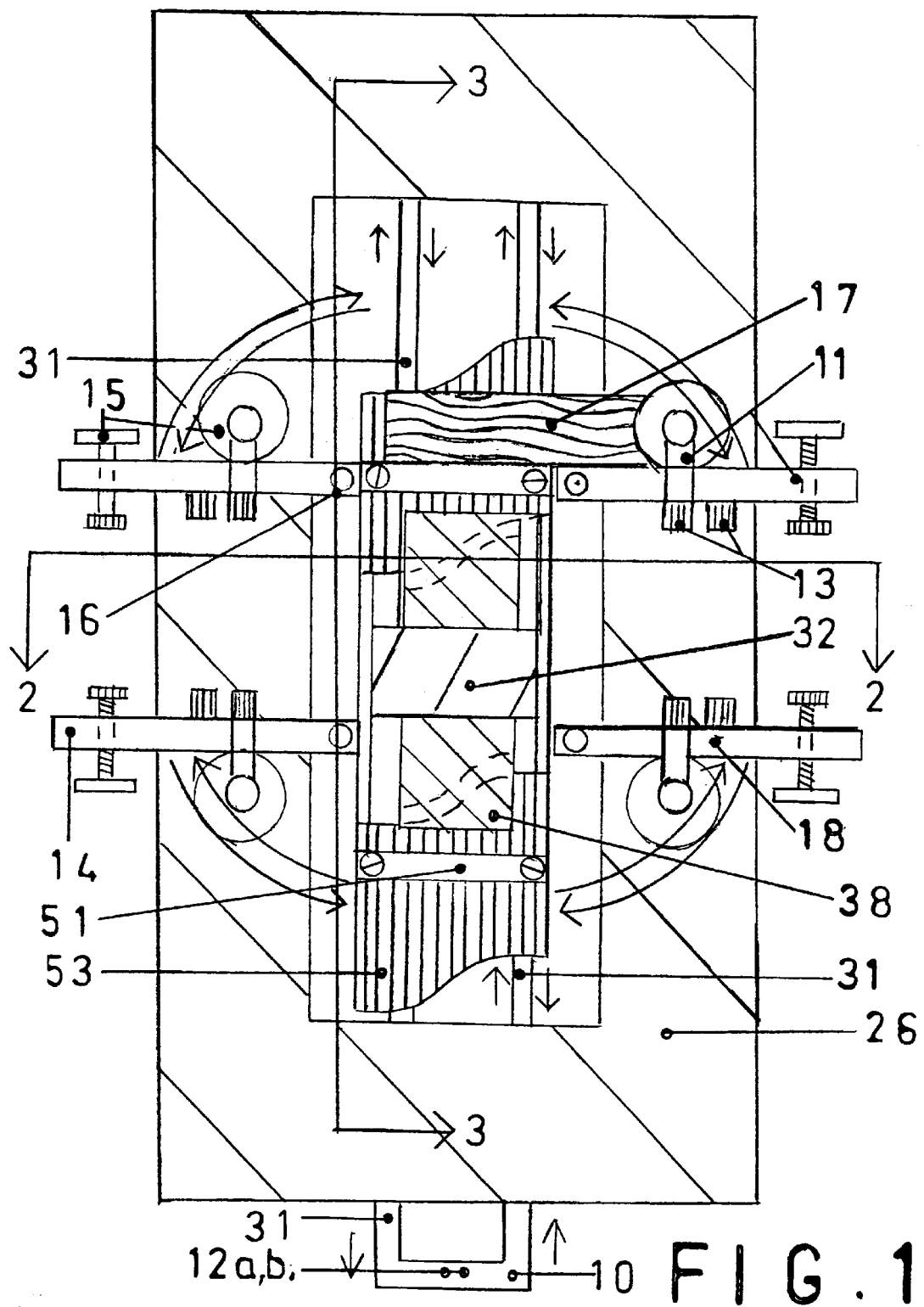
FIG. 1 is a plan view of coping apparatus according to the present invention.

10. Apparatus push/pull motion handles
11. Screw clamp mounting block
12a. Reciprocating motor switch
12b. Linear actuator motor switch
13. Screw clamp post tightening knob
14. Rotating fence
15. Screw clamp
16. Rotating fence pivot tightening knob
17. Body of material
18. Screw clamp attachment post
26. Material support surface
31. Pair of linear slide shafts
32. Pivot frame
33(a). linear slides
33(b). linear slides
35. Rotating fence pivot hinge
36. Blade frame
38. Blade clamp
39. Sheet of rubber
40. Turnscrew
41. Stainless steel
42(a). Saw tooth section of sheet
42(b). Sanding surface section of sheet
43. Stainless steel
44. Speed reducer
45. Speed reducer shaft
46. Motor
50. Linear slide support frame
51. Adjustable material support sheet clamp
52(a). Crank shaft
52(b). Rod
52(c). Offset shaft
53. Adjustable material support sheets
54. Linear actuator
55(a). Pillow blocks
55(b). Shaft and shaft hangers
56. Linear bearing
57. Shaft lock and knob
58. Linear bearing mount
64. Rotation pivot pin
66. Rotation pivot slot
68. Rotation pivot/tightening shaft and knob
70. Pivot frame
72. Rotation pivot pin
74. Rotation pivot/tightening shaft and knob
73. Rotation pivot slot
76. Saw teeth
78. Adhesive backed sand-paper
79. Sand-paper application tool
80. Linear cutting interior blades
81. Blade range of motion indicator arrows
82. Exterior blades
84. Standard interior blades
86. Blade spacers
88. Alternating saw tooth—set
90. Saw-tooth—no set
92. Sawing area (reciprocation within sawing area)
94. Sanding area (reciprocating within sanding area)

SUMMARY

The apparatus of the present invention is used for shaping and sanding a body of rigid material. It comprises a plurality of hard flat sheets of material which are oriented vertically. The upper portion of each sheet contains edges with sharp cutting teeth. The lower portion of each sheet contains edges with no teeth. The sheets are stacked and clamped into any of a variety of predetermined shapes. Next, an adhesive-backed sandpaper material is affixed to the lower portion of the stack of sheets. The sheets are set in reciprocating motion and the body of material to be shaped is first brought into contact with the upper toothed sections of the sheets to effect the shaping of the body. The body is next brought into contact with the lower, non-toothed section (to which sandpaper is affixed) for smoothing the body.

Figure 2:
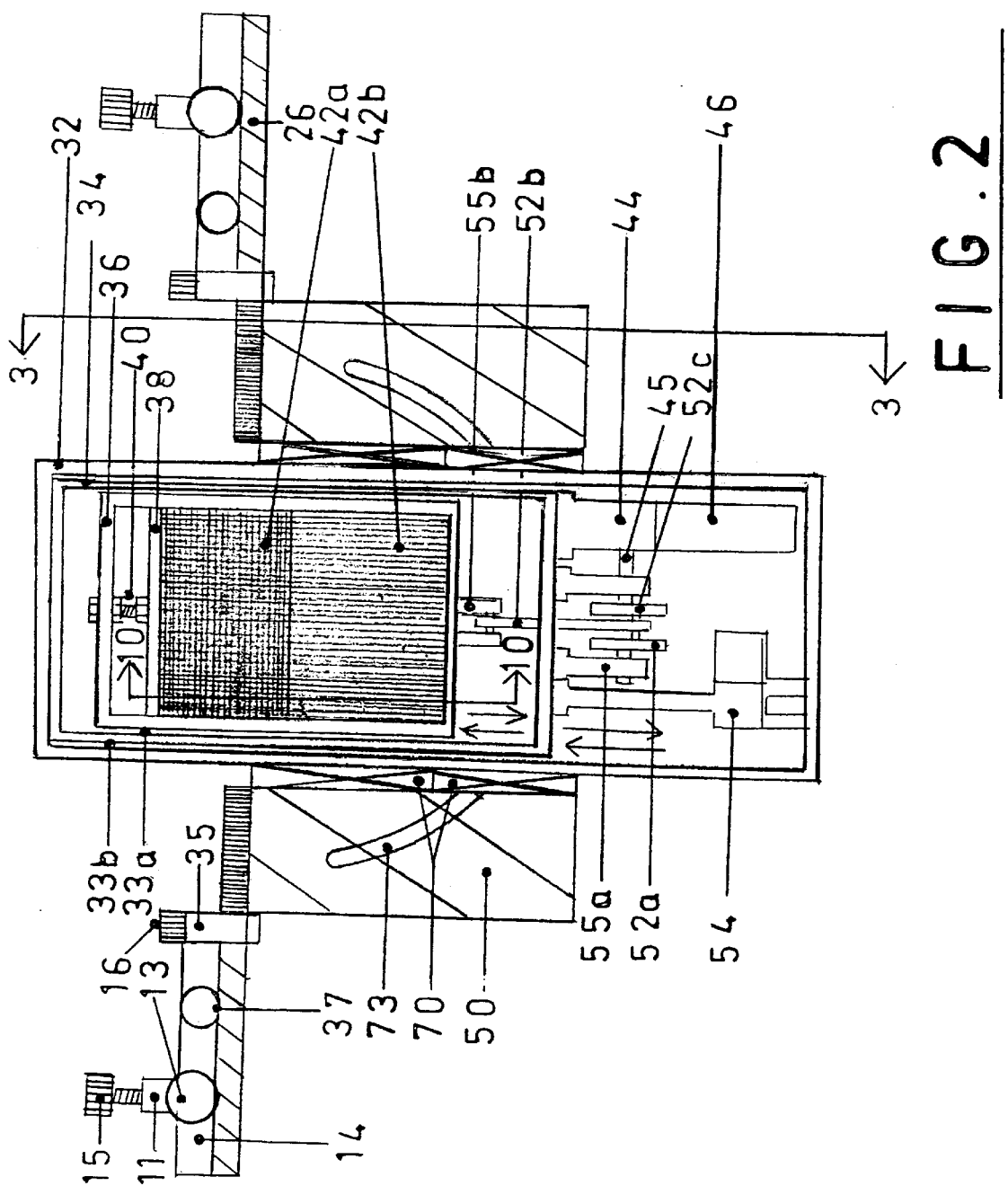
FIG. 2 is a front elevation cut away view of the coping apparatus shown in FIG. 1 taken along the line 2—2.
Figure 3:
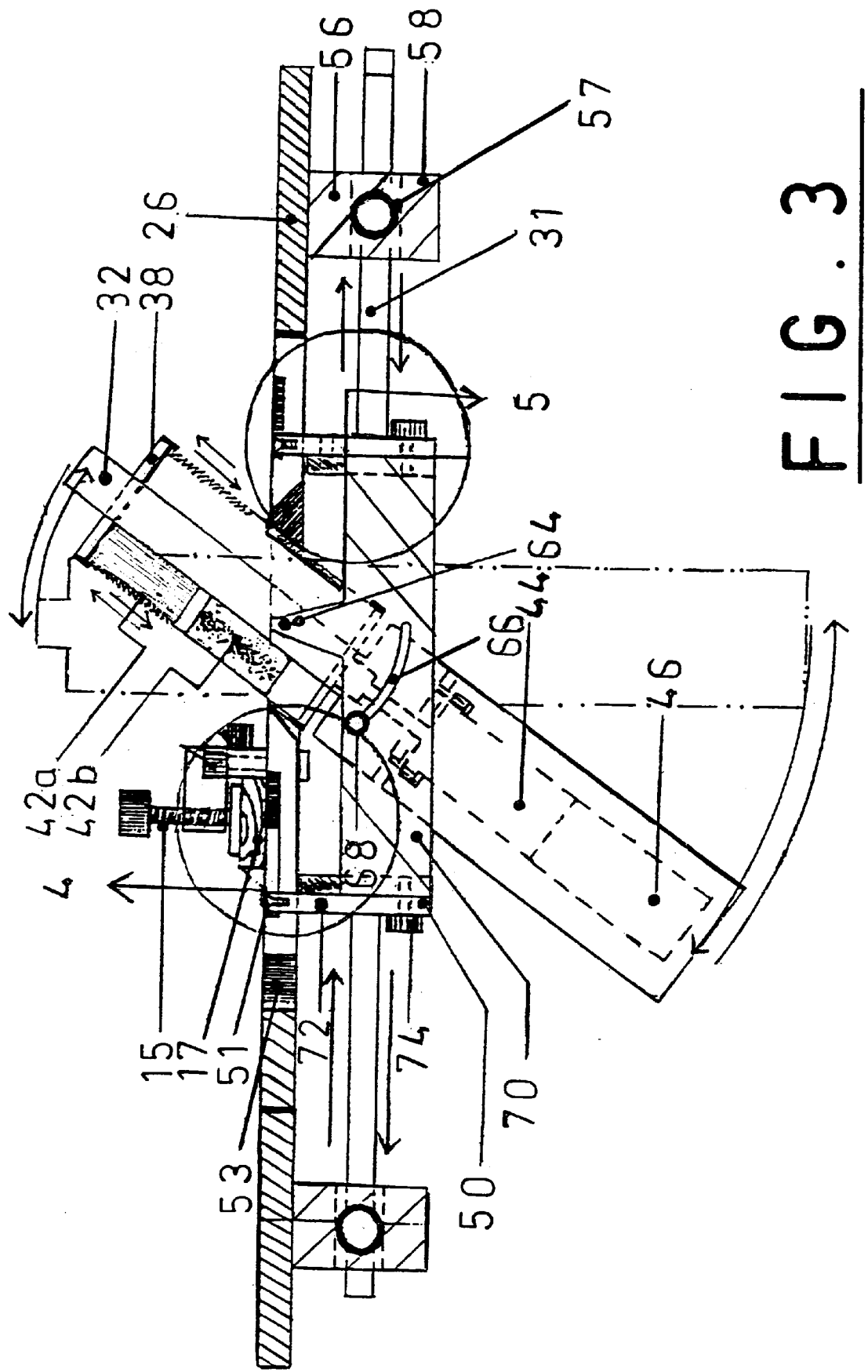
FIG. 3 is a side elevation cut-away view of the coping apparatus shown in FIGS. 1 and 2.

Description—FIGS. 1, 2 and 3—Plan view

A typical embodiment of the tool of the present invention is illustrated in FIG. 1. The apparatus has a material support surface 26 which is made of ½" (1.27 cm) aluminum to provide a lightweight, yet strong support surface. Four rotatable material fences 14, also made of aluminum, are attached to surface 26. Fences 14 can rotate within a 90 degree arc. The cutting and/or sanding apparatus is attached to surface 26.

The apparatus attaches to support surface 26 by means of four bearing mounts 58 encasing four linear bearings 56 (see FIG. 3) and four linear slide shafts 31 made of a minimum of 1" (2.54 cm) stainless ground stock. Linear slide shafts 31 are connected to linear slide support frame 50 (see FIG. 3).

Stack of adjustable material support sheets 53, each comprises of 22-gauge stainless steel, are connected atop linear slide support frame 50 (FIG. 3). Sheets 53 are held in place by clamp 51. Clamp 51 is made of ½" (1.27 cm) thick aluminum with a ⅛" (0.318 cm) rubber coating attached to its underside.

Connected to linear slide support frame 50 is a pivot frame 70 which is attached at rotation pivot pin 72. Pivot frame 70 is attached to pivot frame 32 at rotation pivot pin 64. Blade clamp 38 is attached to pivot frame 32 by means of linear slides 33a and 33b, both of which are made from interlocking brass channels which are graphite lubricated.

Blade frame 36 and phase lift frame 34 are both made of ⅜" (0.953 cm) aluminum (FIG. 2).

Rotating fence 14 is connected to support surface 26 at rotating fence pivot hinge 35. Attached to rotating to rotating fence 14 are screw clamp attachment post 18 and screw clamp post tightening knob 13. Attached to the screw clamp post is screw clamp mounting block 11. Attached to mounting block 11 is screw clamp 15. A body of material 17 rests on material support surface 26 and is clamped by screw clamp 15.

Located at the ends of each pair of linear slide shafts 31 are apparatus push/pull motion handles 10. Electric motor switch 12a (consisting of either a simple single-pole, single-throw switch or a variable-speed control switch) and electric linear actuator motor switch 12b (consisting of a single-pole, double-throw switch) are attached to push/pull motion handles 10.

Description—FIG. 2—Front elevation view

As illustrated in FIG. 2 the cutting and/or sanding apparatus consists of a series of frames and drive components comprising a multidirectional-motion system for the blades and blade frame. A blade frame 36 made of ⅜" (0.953 cm) aluminum encases a series of stacked, thin metal sheets 42 consisting of 22-gauge steel sheets, having a nominal hardness of 50 on the Rockwell scale. These sheets which, are oriented vertically (as illustrated in FIG. 6), have saw teeth on their upper sections 42a and no teeth on their lower sections 42b. The saw tooth design is 7 points to 1" (2.540 cm.) with an alternate face bevel at a 45-degree angle. Each of the sanding surface sections of the sheets 42b have a thin layer of rubber bonded to each edge.

The stacking blade sheets are clamped into place by a screw clamp 38 and a turn screw 40. A linear slide 33a, made of interlocking brass channels which are graphite lubricated, is attached to blade frame 36 and phase-lift frame 34. This allows linear movement of blade frame 36, as indicated by the arrows in FIG. 2.

A motor 46 (1.5 horsepower and 1750 RPM) and a speed reducer 44, which has a 1–5 ratio are attached to phase-lift frame 34. The latter is made of ⅜" (0.953 cm) aluminum. A crankshaft 52a, which is made of ½" (1.27 cm) stainless steel, has a ⅝" (1.588 cm) offset shaft 32c located 1" (2.540 cm) from the speed reducer shaft's centerline. Crankshaft 52a is supported by, and rotates within, pillow blocks 55a. Reciprocal (linear) motion is created from the motors rotary motion by the following means: crankshaft 52a rotates in a circular motion about the centerline of speed reducer shaft 45. Offset shaft 52c rotates in a circle about the center of cranshaft 52a. Crank rod 52b is attached to offset shaft 52c. Upon the rotation of offset shaft 52c crank rod 52b moves in a reciprocal (linear) motion. Rod 52b is attached to shaft and shaft hangers 55b. Shaft and shaft hangers 55b are attached to blade frame 36.

A linear slide 33b, made of interlocking brass channels which are graphite lubricated, is attached to phase lift frame 34 and pivot frame 32, allowing linear movement of frame 34 as indicated by the arrows in FIG. 2. A linear actuator 54 provides an 18" (45.72 cm) travel at a speed of 35 inches (88.9 cm) per minute. The linear actuator has a minimum load rating of 400 lbs, (181.4388 kg.) and is attached to pivot frame 32 and frame 34.

Figure 4:
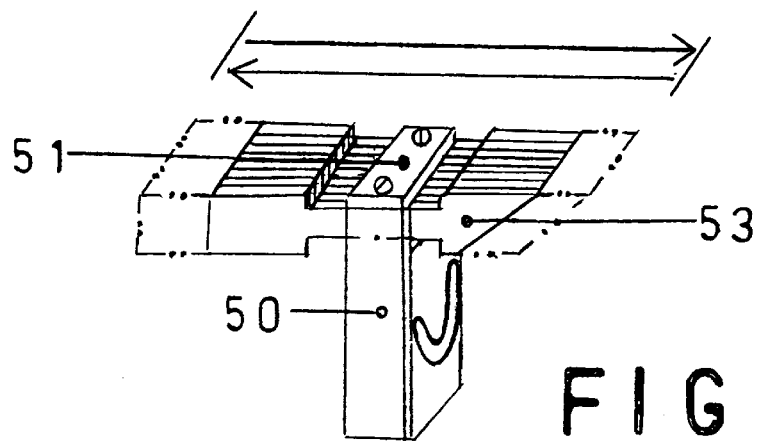
FIG. 4 is an exploded perspective view of the circled section of FIG. 3, labeled 4.
Figure 5:
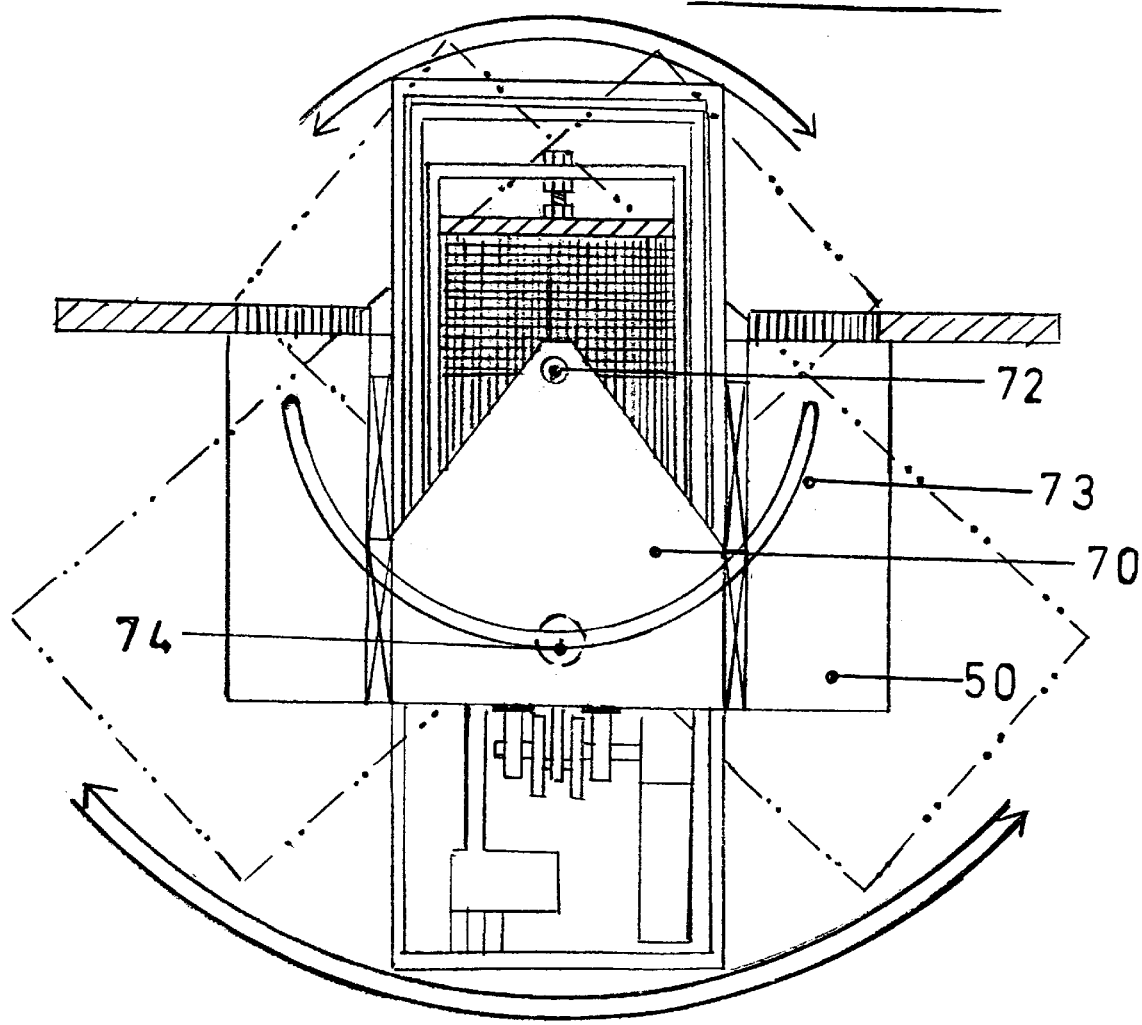
FIG. 5 is a front elevation cut-away view of the circled section of FIG. 3.

Description—FIGS. 3–5—Side elevation, exploded perspective and front elevation views As illustrated in FIG. 3, FIG. 4, and FIG. 5 the apparatus of FIG. 2 is connected to a rolling pivot frame (FIGS. 3 and 5). To the rolling pivot frame is attached an adjustable material support (FIG. 4). The apparatus of FIG. 2 is connected to a rotation pivot pin 64 at pivot frame 32. Rotation pivot pin 64 is attached to a rolling pivot frame 70 which is made of ½" (1.27 cm) aluminum. A rotation pivot pin and tightening nut 68 travel within a rotation pivot track 66. A rolling pivot frame 70 is attached to side pivot pin 72. A side pivot and linear slide support wall 50 is attached to a pair of linear slide shafts 31.

Shafts 31 are made of a minimum of 1" (2.540 cm) stainless ground stock. These shafts travel in a linear direction through linear bearings 56 which are mounted in a linear bearing mount 58.

Inserted within linear bearing mount 58 is shaft lock and tightening knob 57 which, when tightened, holds the linear shafts in a static position.

An adjustable material support sheet clamp 51 is made of ½" (1.27 cm) aluminum with a ⅛ (0.318 cm) rubber sheet bonded to its underside. Sheets 53, made of 22-gauge stainless steel, are clamped to the top of support wall 50 by sheet clamp 51 ¹⁄₃₂" (0.0794 cm) below the top of surface 26.

Rolling pivot frame 70 is attached to support wall 50 at rotation pivot pin 72. Rotation pivot tightening shaft and knob 74 are attached to side pivot and linear slide support wall 50 and travel within pivot slot 73.

Description—FIG. 6a, 6b—Perspective view

As illustrated in FIG. 6 (a perspective view), the stack of sheets forms a sanding surface 42b. When the sheets are clamped, an abrasive adhesive-backed sheet of sandpaper 78 is attached to sanding surface 42b. The sandpaper has a releasable, pressure-sensitive adhesive on its non-abrasive face.

A sandpaper application tool 79 may be employed to push the sandpaper into the intricate recesses of the profile. This application tool is a 22-gauge by 2" (5.08 cm) by 9" (22.86 cm) strip of stainless steel. Saw teeth 76, which are formed in the upper portion edge of the hard, flat sheets of material are ground into the edges with 7 points to the inch (2.540 cm.) and an alternate 45-degree face bevel. The stack of sheets forms sawing surface 42a.

Description—FIG. 7—Exploded plan view

As illustrated in FIG. 7, blade spacer 86 is made of 22-gauge stainless steel. The spacer is laminated the full length of the sheet. Blade spacer 86 is laminated to opposing sides of the linear cutting interior blades 80 (FIG. 9). Exterior blades 82 consist of alternating teeth with no set and teeth with a set (see FIG. 9). Standard interior blades 84 consist of only teeth with no set (FIG. 9).

Figure 8:
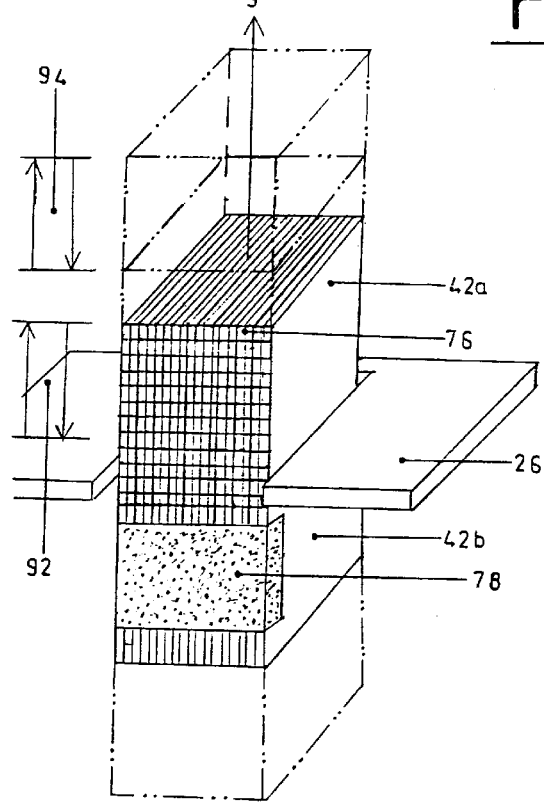
FIG. 8 is a perspective view of the stacking, cutting, and sanding blades shown in FIG. 6, displaying the reciprocal motion within the cutting phase and sanding phase.

Description—FIG. 8—Perspective view

FIG. 8 shows the relationship between the sheets with abrasive edges and edges to which an abrasive material may be applied (FIG. 6) and support surface 26. Sawing area 92 is where the toothed section of the plurality of sheets reciprocates adjacent to support table 26. Sanding area 94 is where the non-toothed and adhesive backed sandpapered section of the plurality of sheets reciprocates adjacent to the material support table 26 by means of lift created by linear actuator 54 (FIG. 2).

Figure 9B:
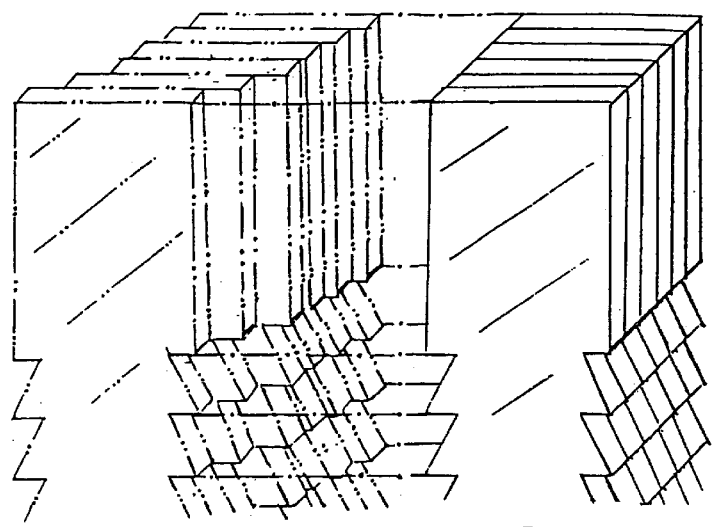
FIG. 9b is an exploded perspective view displaying the sheets and sheet movement into a predetermined configuration.
Figure 9A:
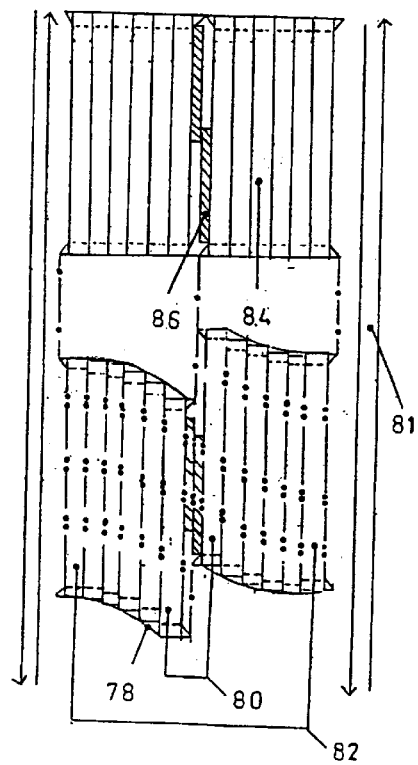
FIG. 9a is an exploded sectional plan view of the circled section of FIG. 8, displaying the sheets and sheet movement into a predetermined configuration.

Description—FIG. 9a, 9b—Exploded plan sectional view, exploded perspective view

FIG. 9 shows all of the components discussed and illustrated in FIG. 7 stacked so that the plurality of sheets form a predetermined shape. Additionally the forward/backward range of motion of the plurality of hard, flat sheets of material and displayed by blade range-of-motion arrows 81. Also displayed are linear cutting interior blades 80, which are interchangeable with the standard interior blades 84, and are utilized in the cutting of shapes which have an interior flat spot as illustrated. The linear cutting interior blades 80 allow the straight line alignment of teeth from front to back of the stacking blade system for the purpose of the exact alignment of the positive and negative profiles. The set of the teeth creates a kerf which is wider than the blades width, thereby preventing the blade from binding in the material as it is being cut.

Figure 10:
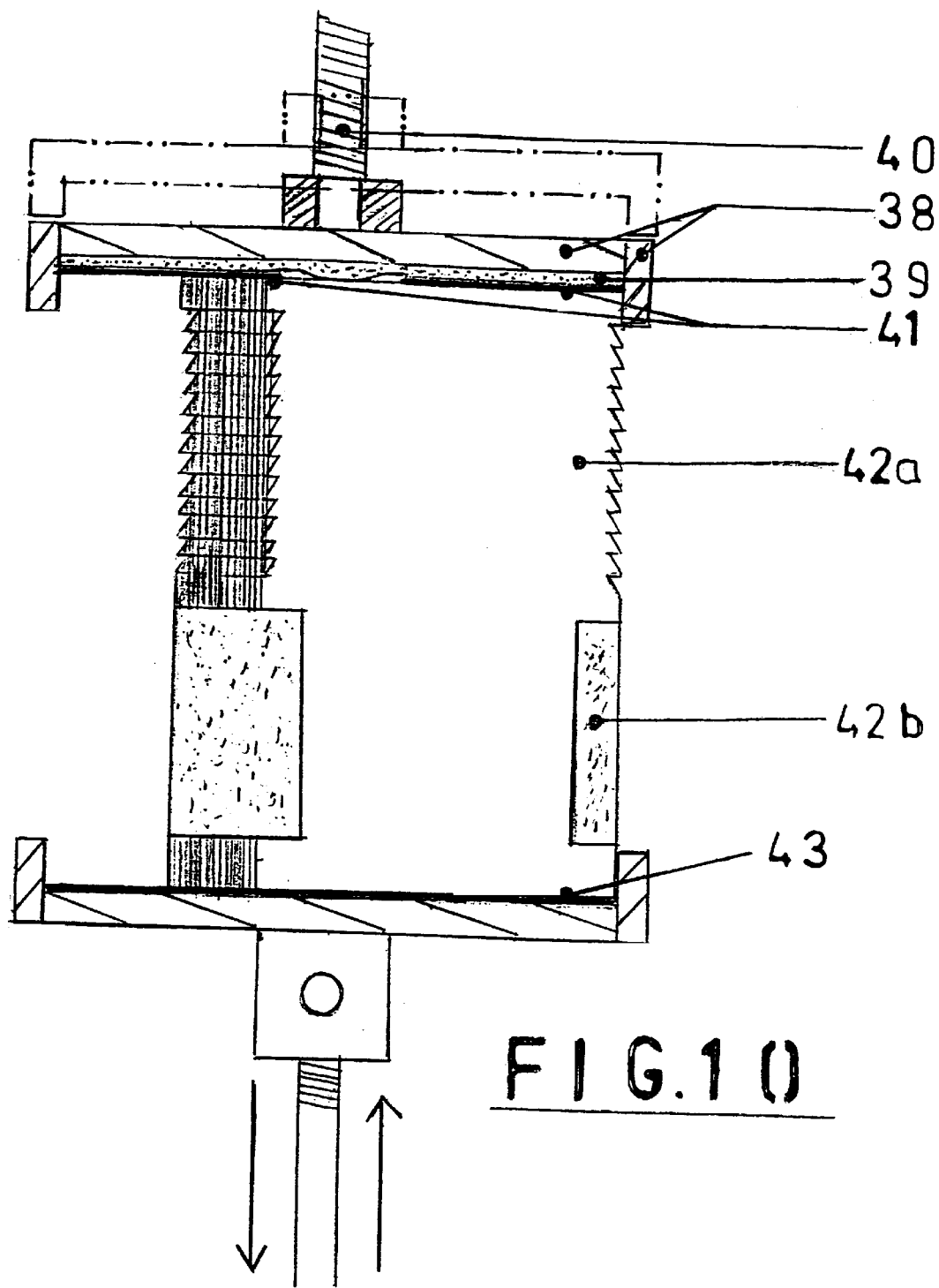
FIG. 10 is a side elevation cut away view of the coping apparatus shown in FIG. 2.

Description—FIG. 10—Side elevation

FIG. 10 shows how stacked sheets 42 are clamped into place by blade clamp 38. Blade clamp 38 is made of ⅜" (0.953 cm.) aluminum. To the entire underside of blade clamp 38 is attached a ¼" (0.635 cm) sheet of rubber 39. To the underside of the sheet of rubber 39 are attached two pieces of 22-gauge stainless steel 41. Pieces 41 cover all but a 1" (2.540 cm.) section of the underside of sheet of rubber 39 as illustrated. Stacked sheets 42 rest atop 22-gauge stainless steel 43. Stacked sheets 42 are clamped by turnscrew 40.

Operation—FIGS. 1–10

The manner of using the coping and profile cutting and/or sanding apparatus is as follows:

In order to cope (shape the end of) a length of crown molding (not shown in drawings), blade clamp 38 is lifted by turnscrew 40, (FIG. 2) allowing movement of sheets 42 in a forward and/or backward direction (FIG. 9). A miter cut is made on the end of the crown molding which is to be coped. The mitered crown molding is placed on support surface 26 with the mitered end of the molding facing perpendicular to the ends of sheets 42 (FIG. 1). The mitered end of the molding is pushed into the ends of the sheets 42, causing sheets 42 to slide backwards so that the profile of the molding is formed at the edges of the sheets (FIG. 9).

The above discussion and drawings displays that the plurality of members of material, which are sheets 42, are arranged in a plurality of contiguous respective planes. Also, that the operator may translate each of the plurality of members to any position within its respective plane so that the plurality of members of material can assume any one of a plurality of predetermined relative configurations.

Clamp 38 is then lowered onto the tops of the sheets 42 by turning screw clamp 40 (FIG. 2). The sheets 42 are immovably locked into place in order that the above crown molding shape may be maintained during the cutting and sanding operation.

The above discussion and drawings displays that the operator can immovably fix or clamp the plurality of members, which are sheets 42, in any one of a plurality of predetermined configurations.

The sandpaper 78 is attached to the sanding surface section of sheets 42b (FIG. 6). This accomplished by starting the lamination at one side of the sanding surface which is created by the edges of the sheets, and moving across the face of the surface, pushing the adhesive-backed sandpaper onto the sheet edges.

The above discussion and drawings displays that upon the fixing or clamping of the plurality of members in any one of the plurality of predetermined configurations, the members form a surface with a predetermined shape.

The uniform lamination of the sandpaper is accomplished by its lamination to the sheet edges, one sheet at a time, by pushing the sandpaper onto the sheet edge by use of the edge of sandpaper application tool 79 (FIG. 6).

The operator next loosens tightening knob 68 and rotates the apparatus to a 45-degree angle, and then tightens the same (FIG. 3). This accomplishes the back cutting of the crown molding so that it will fit into a 90-degree corner.

Alternatively, the operator may loosen knob 74 and tip the blade frame to the right or left to the desired angle, and then tighten the same (FIG. 5).

If the cut to be done is at a compound angle, the operator may perform both of the above operations until the desired compound angle is achieved, thus displaying the tool's ability to easily and accurately cut shapes into materials within two and three dimensions.

Next, clamp 51 is loosened and adjustable material support sheets 53 are moved into proximity to sheets 42 (FIGS. 1 and 4). Sheet clamp 51 is then tightened. To cope the crown molding at the end of its length, the following procedure is required: Rotating fences 14 are rotated to a position parallel with the plurality of stacking sheets 42 and locked into place by the tightening of rotating fence pivot tightening knobs 16 (FIG. 1). The crown molding is placed upon material support surface 26 parallel to sheets 42. Screw clamps 15 are tightened upon the crown molding, making it immovable for the milling operation, thus displaying the tool's ability to cut and sand the material while the material is immovably clamped on a horizontal surface.

At this time the cutting of the crown molding is ready to commence. Motor switch 12a (FIG. 1) is turned on, causing the blade frame and blades to recipricate. Reciprocal (linear) motion is created from the motors rotary motion by the following means: crankshaft 52a rotates in a circular motion about the centerline of speed reducer shaft 45. Offset shaft 52c rotates in a circle about the center of crankshaft 52a. Crank rod 52b is attached to offset shaft 52c. Upon the rotation of offset shaft 52c crank rod 52b moves in a reciprocal (linear) motion. Rod 52b is attached to shaft and shaft hangers 55b. Shaft and shaft hangers 55b are attached to blade frame 36. This is the phase in which only the sawtoothed section of blades 42a are reciprocated adjacent to table 26. Handle 10 is then pulled with slow even pressure into the clamped crown molding for cutting. When the cut is completed, handle 10 is pushed away, causing the blades to disengage from the crown molding being cut.

At this time the sanding of the crown molding is ready to commence. Switch 12b (FIG. 1) is turned to the "up" position and the blades and blade frame 36 are lifted up to recipricate in the sanding area 94 (FIG. 8). This is the area in which only the sanding blade section of sheets 42b are reciprocated adjacent to table 26. Handles 10 (FIG. 1) are then pulled with slow even pressure into the clamped material for sanding. When the sanding is completed, handle 10 is pushed back into its original position and switch 12b is turned to the "down" position until the blades and blade frame return to their original position. The above discussion and drawings show the tool's ability to achieve the cutting and sanding of complex shapes with a simple straight-line blade manipulation. The above discussion and drawings also show the tool's ability to leave a smoothly sanded surface after the cutting of the material to the desired shape. Switch 12a is then turned off. The cutting and sanding of the shape is complete.

The above discussion and drawings displays the apparatus ability to reciprocate the plurality of members of material, which are sheets 42, so that when the plurality of members of material and a body of material 17 are engaged, the body of material 17 is shaped to a shape which matches the predetermined shape created by the plurality of members of material.

Alternatively, should the operator wish to form the exact negative of the above profile, the above steps may be followed with the material placed on the opposite side of the material support surface (FIG. 1). The opposite side of sheets 42 are brought into contact with the crown molding.

The above discussion and drawings displays the tool's ability to achieve the simultaneous setup of both the positive profile and the negative of that profile. Additionally, at the same time is achieved the simultaneous setup of both the cutting and sanding profile shapes in both positive and negative profiles.

Additionally, the above discussion and drawings show the tool's ability to cut and sand both the original shape and the negative of the original shape with only one setup operation.

The above discussion and drawings also shows that the tool requires minimal skill to operate, yet can provide repetitive, high-tolerance shape cutting and sanding with zero margin of error between the cutting profile shape and the sanding profile shape.

Summary, Ramifications, and Scope

Thus the reader will see that the coping and profile cutting and/or sanding apparatus of the invention provides a highly versatile, time saving, precision cutting and sanding device that can be used by persons of almost any skill level.

The apparatus can easily cut and sand shapes into the sides, top, bottom, or ends of a variety of materials. Additionally, the operator quickly and simultaneously adjusts the sheets of material to the desired profiles. The apparatus accurately cuts shapes into materials in two and three dimensions, leaving a smoothly sanded surface after cutting the material into the desired shape.

The ease of material handling to perform the cutting and sanding operations of complex shapes is the result of first immovably clamping the material to the horizontal material support surface and then performing the cutting and sanding operation by simple straight-line blade manipulation.

The plurality of sheets of material are easily adjusted to any profile and automatically yields the negative of the original profile. These above sheets of material, when clamped immovably for the cutting and sanding operation, yield a repetitive high tolerance profile cutting and sanding tool with zero margin of error between the cutting profile and the sanding profile.

While the above description contains many specificities, these should not be construed as limitations on the scope of the invention, but rather as an exemplification of one preferred embodiment thereof.

Other embodiments may be used or modifications and additions may be made to the described embodiment for performing within the scope of the present invention. For example:

(a) Multiple stacks of sheets of material may be combined in the same tool to execute multiple shape set-ups, performing cutting and sanding operations from multiple directions.

(b) The apparatus can be made at any size, from microscopic to heavy industrial.

(c) The sheets and adhesive-backed abrasives can be made of any material and design appropriate to the material which is to be cut.

(d) The sheets of material shape can be altered in a variety of ways appropriate to the use of the apparatus.

(e) The parts of the apparatus can be connected or associated with their adjacent parts in a variety of ways, e.g., the motor can be placed above the stacking sheets of material instead of below; the sanding surface may be placed above the cutting surface instead of below, etc.

(f) The control and drive components may be modified in a variety of ways, e.g., by human powered mechanical devices, hydraulics, pneumatics, etc.

(g) The apparatus can be made separately as only a stationary cutting tool or only a stationary sanding tool. It can also be used as a hand-held power tool of combined or separate function and as a non-power hand tool of combined or separate functions.

(h) The sanding section of the sheets of material may be modified for the sanding of extremely precise shapes. This may be accomplished by filling the voids between the sheets with a bonding, yet removable material. The material may be applied by the "screeding" of this material along the "high points" that exist after the thin square edged sheets are adjusted.

In another approach a flexible, yet rigid adhesive-backed sheet of material is adhered to the same "high point".

(i) The material with abrasive edges which is used for the cutting and sanding operation may be made of shapes other than sheets, eg. abrasive wires which are strung top and bottom on moveable support shets, etc.

(j) This technology can be utilized in the creation of sanding attachments or cutting attachments which can be attached to existing machinery such as recipricating saw, in line profile sanders, etc.

(k) The saw teeth may be made in such a way as to attach to the edges of the sheets so that when the teeth become dull they may be disposed of and replaced with sharp saw teeth.

Therefore, the present invention should not be limited to any single embodiment, but rather construed in breadth and scope in accordance with the appended claims in their legal equivalents.

I claim:

1. An apparatus for shaping a body of material, comprising:

(a) a plurality of members of material, said plurality of members of material being arranged in a plurality of contiguous respective planes, (b) first means for enabling each of said plurality of members of material to be translated to a position within its respective plane so that said plurality of members of material can assume a plurality of predetermined relative configurations, (c) second means for enabling said plurality of members of material and said body of material to engage each other, (d) each of said members of material having a cutting surface and another surface to which an abrasive material is affixed.

2. The apparatus of claim 1 wherein said cutting surfaces has a plurality of sharp teeth so as to form a cutting blade.

3. The apparatus of claim 2 wherein said members of material comprise a plurality of cutting blades, some of said cutting blades having sharp teeth without any set.

4. The apparatus of claim 2 wherein said members of material comprise a plurality of cutting blades, some of said cutting blades having sharp teeth without any set and some of said sharp teeth having a set to only one side.

5. The apparatus of claim 1, further including means for immovably fixing or clamping and plurality of members of material in one of said plurality of predetermined relative configurations so that said plurality of members of material form a surface with a predetermined shape.

6. The apparatus of claim 1 wherein said cutting surface on each of said plurality of members has one section which contains sharp teeth for forming a cutting blade, and said other surface to which said abrasive material is affixed is non-toothed.

7. The apparatus of claim 6, further including a mechanism for positioning and accessing said one section in a cutting phase and said other section in a sanding or smoothing phase, whereby, if said plurality of members is reciprocated, a single configuration of said plurality of members of material can first cut a predetermined shape into said body of material, and then sand or smooth said predetermined shape.

8. The apparatus of claim 7 wherein said mechanism is a frame and linear actuator.

9. The apparatus of claim 1 wherein each of said plurality of members of material has opposite ends, each of said opposite ends having said cutting surface and said surface to which an abrasive material is affixed, the shape of one end of each member of material being the inverse and negative of the shape of its opposite end, whereby positive and negative shaping in the same predetermined shape may be made.

10. The apparatus of claim 1, further including a blade frame for supporting said plurality of members of material for allowing said plurality of members of material to move into one of said plurality of predetermined configurations.

11. The apparatus of claim 10 wherein said blade frame includes a blade clamp for immovably fixing said members in one of said plurality of predetermined relative configurations.

12. The apparatus of claim 11 wherein said blade clamp includes a metal member with a rubber member behind it with an opening in said metal member so that said rubber member protrudes through said metal member upon being clamped.

13. The apparatus of claim 1, further including means for supporting said members of material and said body of material for allowing said members of material, when said members of material are reciprocated, to engage said body of material in order to shape said body of material.

14. The apparatus of claim 13, further including a linear slide mechanism and means for supporting said linear slide mechanism, whereby when said members of material are reciprocated, they may engage said body of material in order to shape said body of material.

15. The apparatus of claim 13 further including a rotational device and means for supporting said rotational device, said means for supporting said rotational device being affixed to said means for supporting said members of material and said body of material, whereby when said members are reciprocated, they may engage said body of material at any of a plurality of predetermined angles in order to create said predetermined shape at a predetermined angle.

16. The apparatus of claim 15 wherein said means for supporting said rotational device contains a plurality of adjustable material support members, whereby said body of material will be supported in proximity to the point of engagement of said body of material and said members of material.

17. The apparatus of claim 13 further including a fence with a fixing or clamping mechanism that can be rotated to an angle within a predetermined range of angles in relation to said plurality of member of material.

18. The apparatus of claim 1 wherein said members of material are sheets of material.

19. The apparatus of claim 18 wherein said sheets of material are each hard and flat.

20. The apparatus of claim 18, further including a plurality of hard and flat spacer sheets affixed to the respective sides of said plurality of sheets of material for aligning the edges of said sheets of material for positive and negative cuts.

21. The apparatus of claim 1, further including means for reciprocating said members.

22. The apparatus of claim 21 wherein said means for reciprocating said members is a linear drive system that includes a motor.

23. An apparatus for shaping a body of material, comprising:
(a) a plurality of members of material,
(b) first means for enabling each of said plurality of members of material to be moved in a linear direction within a plurality of contiguous respective planes so that said members can assume a plurality of predetermined configurations, and
(c) second means for moving said plurality of members of material in a predetermined direction so that said plurality of members of material will engage said body of material,
(d) each of said plurality of members of material having at least one section which contains a cutting surface, and at least one other section which has a surface to which an abrasive material is affixed.

24. The apparatus of claim 23 wherein said one section which contains a cutting surface on each of said plurality of members contains sharp teeth for forming a cutting blade.

25. The apparatus of claim 23 wherein each of said plurality of members of material has opposite ends, each of said opposite ends having said cutting surface and said surface to which an abrasive material is affixed, the shape of one end of each member of material being the inverse and negative of the shape of its opposite end, whereby positive and negative shaping in the same predetermined shape may be made.

26. The apparatus of claim 23, further including means for supporting said members of material and said body of material for allowing said members of material to engage said body of material in order to shape said body of material.

27. The apparatus of claim 26 wherein said means for supporting said members of material and said body of material contains a plurality of adjustable material support members, whereby said body of material is supported in proximity to the point of engagement of said body and said members of material.

28. The apparatus of claim 23, further including means for reciprocating said members.

29. The apparatus for shaping a body or material, comprising:
(a) a plurality of members of material,
(b) means for positioning said plurality of members of material in a plurality of predetermined configurations so that said plurality of members of material form a surface with a predetermined shape,
(c) means for reciprocating said plurality of members of material so that when said plurality of members of material and a body of material are engaged, said body of material is shaped to a shape which matches said predetermined shape,
(d) each of said plurality of members of material having at least one section which contains a cutting surface and at least one other section which has a surface to which an abrasive material is affixed.

30. The apparatus of claim 29 wherein said one section of each of said plurality of members of material contains sharp teeth for forming a cutting blade, and said other section to which an abrasive material is affixed is non-toothed.

31. The apparatus of claim 29 wherein each of said plurality of members of material has opposite ends, each of said opposite ends having said cutting surface and said surface to which an abrasive material is affixed, the shape of one end of each member of material being the inverse and negative of the shape of its opposite end, whereby positive and negative shaping in the same predetermined shape may be made.

32. The apparatus of claim 29, further including means for supporting said members of material and said body of material for allowing said members of material to engage said body of material in order to shape said body of material.

33. The apparatus of claim 32 wherein said means for supporting said members of material and said body of material contains a plurality of adjustable support members, whereby said members of material are supported in proximity to the point of engagement of said body of material and said members of material.

* * * * *